(12) United States Patent
Moorcroft et al.

(10) Patent No.: US 12,378,905 B2
(45) Date of Patent: Aug. 5, 2025

(54) EXHAUST SYSTEM, CONTROLLER AND METHOD FOR AN INTERNAL COMBUSTION ENGINE

(71) Applicant: JAGUAR LAND ROVER LIMITED, Coventry (GB)

(72) Inventors: Adam Moorcroft, Birmingham (GB); Mohammad Sadique, Coventry (GB)

(73) Assignee: JAGUAR LAND ROVER LIMITED, Warwickshire (GB)

( * ) Notice: Subject to any disclaimer, the term of this patent is extended or adjusted under 35 U.S.C. 154(b) by 0 days.

(21) Appl. No.: 18/564,581

(22) PCT Filed: May 27, 2022

(86) PCT No.: PCT/EP2022/064425
§ 371 (c)(1),
(2) Date: Nov. 27, 2023

(87) PCT Pub. No.: WO2022/248672
PCT Pub. Date: Dec. 1, 2022

(65) Prior Publication Data
US 2024/0254905 A1    Aug. 1, 2024

(30) Foreign Application Priority Data
May 28, 2021    (GB) ..................... 2107677

(51) Int. Cl.
*F01N 3/029* (2006.01)
*B01D 46/44* (2006.01)
(Continued)

(52) U.S. Cl.
CPC .......... *F01N 3/029* (2013.01); *B01D 46/442* (2013.01); *B01D 46/448* (2013.01); *B01D 46/84* (2022.01);
(Continued)

(58) Field of Classification Search
CPC combination set(s) only.
See application file for complete search history.

(56) References Cited

U.S. PATENT DOCUMENTS

| | | |
|---|---|---|
| 2011/0219752 A1 | 9/2011 | Gonze et al. |
| 2012/0124995 A1 | 5/2012 | Springer |

(Continued)

FOREIGN PATENT DOCUMENTS

| | | |
|---|---|---|
| DE | 102015212514 A1 | 1/2017 |
| GB | 2555851 A | 5/2018 |
| WO | 2020069551 A1 | 4/2020 |

OTHER PUBLICATIONS

International Search Report and Written Opinion corresponding to application PCT/EP2022/064425, dated Sep. 9, 2022, 13 pages.
(Continued)

*Primary Examiner* — Binh Q Tran
(74) *Attorney, Agent, or Firm* — TROUTMAN PEPPER LOCKE LLP; Dustin B. Weeks; Carter B. Hale (57) ABSTRACT

Aspects of the present invention relate to an exhaust system (207) for exhausting combustion gases from an internal combustion engine (101). The exhaust system (207) includes an exhaust conduit (215) for conveying exhaust gases from the internal combustion engine (101). A particulate filter (214) is providing for filtering particulates from the exhaust gases conveyed by the exhaust conduit (207). A supply inlet (216) is arranged to introduce gas into the particulate filter (214) to promote regeneration. The supply inlet (216) is disposed upstream of the particulate filter (214) and downstream of a catalytic convertor (209). A control valve (218) is provided for controlling the supply of gas to the particulate filter (214) to control regeneration. Aspects of the present invention also relate to a vehicle (100) incorporating a controller (104); and a method of controlling
(Continued)

operation of the control valve (218) to control regeneration of the particulate filter (214).

13 Claims, 6 Drawing Sheets (51) Int. Cl.
*B01D 46/84* (2022.01)
*F01N 3/05* (2006.01)
*F01N 3/22* (2006.01)
*F01N 3/30* (2006.01)
*F01N 3/32* (2006.01)
*F01N 9/00* (2006.01)
*F01N 13/00* (2010.01)

(52) U.S. Cl.
CPC ............ *F01N 9/002* (2013.01); *F01N 13/009* (2014.06); *B01D 2279/30* (2013.01); *F01N 3/05* (2013.01); *F01N 3/222* (2013.01); *F01N 3/225* (2013.01); *F01N 3/303* (2013.01); *F01N 3/32* (2013.01); *F01N 2250/06* (2013.01); *F01N 2270/04* (2013.01); *F01N 2550/04* (2013.01); *F01N 2550/14* (2013.01); *F01N 2900/04* (2013.01); *F01N 2900/1602* (2013.01); *F01N 2900/1606* (2013.01)

(56) References Cited

U.S. PATENT DOCUMENTS

| | | | |
|---|---|---|---|
| 2019/0203629 A1* | 7/2019 | Zink | F01N 11/002 |
| 2019/0345857 A1 | 11/2019 | Rollinger et al. | |
| 2019/0383188 A1* | 12/2019 | Paukner | F01N 3/2013 |
| 2020/0063630 A1 | 2/2020 | Tanaka et al. | |
| 2020/0123996 A1* | 4/2020 | Fey | F02D 41/1456 |
| 2020/0224573 A1* | 7/2020 | Williges | F01N 3/035 |
| 2020/0271046 A1 | 8/2020 | Kelly et al. | |
| 2021/0010434 A1* | 1/2021 | Suzuki | F02D 41/38 |
| 2021/0025303 A1* | 1/2021 | Kaack | F01N 3/101 |
| 2021/0189941 A1* | 6/2021 | Riechert | F01N 3/30 |
| 2022/0136423 A1* | 5/2022 | Hemminger | F01N 3/2033 60/286 |

OTHER PUBLICATIONS

Combined Search and Examination report corresponding to application GB2107677.3, dated Nov. 3, 2021, 9 pages.
Search Report corresponding to application GB2107677.3, dated Apr. 8, 2022, 3 pages.
Examination Report corresponding to application GB2107677.3, dated Aug. 14, 2023, 6 pages.
European Office Action corresponding to application 22730857.4, dated Feb. 6, 2025, 7 pages.

* cited by examiner

EXHAUST SYSTEM, CONTROLLER AND METHOD FOR AN INTERNAL COMBUSTION ENGINE

TECHNICAL FIELD

The present disclosure relates to an exhaust system, controller and method. In particular, but not exclusively, the present disclosure relates to an exhaust system for controlling regeneration of an aftertreatment system in an exhaust system of an internal combustion engine. The method(s) and apparatus described herein have particular application in relation to a road vehicle, such as a car. Aspects of the invention relate to an exhaust system; to a controller; to a method; to a non-transitory computer-readable medium; and a vehicle.

BACKGROUND

Traditionally 'fuel-cut' is used during engine overrun and shut-down scenarios to save fuel. This has the added benefit of allowing the engine to pump un-burnt, oxygen-rich air into an exhaust system connected to the engine. The oxygen-rich air passes over a gasoline particulate filter (GPF) disposed in the exhaust system and allows the particulates trapped in the GPF (which may be referred to as soot) to burn, thereby regenerating GPF. In order to perform regeneration the GPF must be hot, typically in the 600 to 700° C. temperature range. However, this also means un-burnt air saturates the exhaust catalyst with oxygen which means it no longer operates optimally when overrun is ceased, and addressing this may require subsequent fuel enrichment to bring the catalyst back to optimum operating conditions. Thus, the potential fuel-cut saving possible on drive cycles may be reduced due to the necessity of fuel enrichment on a re-started engine, or an engine no longer in overrun.

It is usual for other types of aftertreatment system to be provided in the exhaust system. For example, a catalytic converter (such as a three-way catalytic converter) may be provided in the exhaust system. The GPF is typically disposed downstream of the catalytic converter. In certain arrangements, the GPF may function as a catalytic converter (typically referred to as an active GPF). During regeneration of the GPF, air is supplied from the internal combustion engine and first passes through the catalytic converter. This may send the catalytic converter into an oxygen (O2) rich condition that may affect the ability of the catalytic converter to reduce the NOx component of the exhaust gases. This may necessitate operating the internal combustion engine in an engine rich mode to perform catalyst neutralisation enrichment, for example after an active regeneration event for the GPF. Such a change to the operation of the internal combustion engine may alter emissions. The catalyst neutralisation enrichment may also reduce potential fuel savings that may be achieved by a fuel cut event.

The Applicant's earlier application GB 1901673.2 discloses a method and apparatus for sequentially cutting the air passing through the engine, via active tappet control (CVVL), followed by cutting the injection (after the last inducted air has received injection). At least in certain embodiments, this control strategy avoids saturating the catalyst with air during fuel cut-off saving. So, stopping the airflow through the engine may reduce or negate the need for catalyst neutralisation enrichment. This may permit an improvement in the realised fuel savings. The contents of GB 1901673.2 are incorporated herein in their entirety by reference.

The incorporation of a GPF in the exhaust system may require a modified control strategy to provide appropriate regeneration.

It is an aim of the present invention to address one or more of the disadvantages associated with the prior art.

SUMMARY OF THE INVENTION

Aspects and embodiments of the invention provide an exhaust system, a controller, a vehicle comprising a controller, a method and a non-transitory computer readable medium as claimed in the appended claims.

According to an aspect of the present invention there is provided an exhaust system for exhausting combustion gases from an internal combustion engine, the exhaust system comprising:

- an exhaust conduit for conveying exhaust gases from the internal combustion engine;
- a particulate filter for filtering particulates from the exhaust gases conveyed by the exhaust conduit;
- a supply inlet arranged to introduce gas into the particulate filter to promote regeneration, the supply inlet being disposed upstream of the particulate filter and downstream of a catalytic convertor; and
- a control valve for controlling the supply of gas to the particulate filter to control regeneration. The supply inlet enables gas to be supplied directly to the particulate filter to promote regeneration. The gas may bypass other aftertreatment systems, such as a catalytic converter, in the exhaust system. At least in certain embodiments, regeneration of the particulate filter may be performed without supplying the gas to the catalytic converter. This may reduce or avoid the need to perform catalytic neutralisation enrichment, for example following operation of the internal combustion engine in a fuel cut scenario. However, the method and apparatus described herein are not restricted to operation when the internal combustion engine is operating in a fuel cut scenario. The provision of the supply inlet in the exhaust system may also reduce or avoid the need for changes to the operation of the internal combustion engine, for example changes in the air/fuel ratio (lambda). At least in certain embodiments, the exhaust system may help to improve fuel economy. Advantageously the use of a supply inlet for introducing gas into the particulate filter may promote regeneration of the particulate filter in any engine operating condition where the particulate filter temperature is sufficiently high. Therefore, regeneration may be performed other than during an overrun condition of the engine.

At least in certain embodiments, the gas is air. The gas may be supplied to the supply inlet at a pressure which is higher than the normal operating pressure of the exhaust gases in the exhaust conduit. In use, the gas may introduced into the exhaust conduit upstream of the particulate filter to promote regeneration of the particulate filter.

The exhaust system may comprise a supply conduit for supplying the gas to the supply inlet.

The control valve can be selectively opened to supply gas to the particulate filter in order to enable or to promote regeneration of the particulate filter. The control valve may be disposed at or proximal to the supply inlet. Alternatively, the control valve may be provided in the supply conduit.

The regeneration of the particulate filter may occur when the temperature of the particulate filter is sufficiently high. The exhaust system may be configured to open the control valve in dependence on the determined temperature of the particulate filter. The control valve may be opened to supply gas to regenerate the particulate filter when the determined temperature of the particulate filter is greater than a predetermined temperature value. The control valve may be closed to inhibit the supply of gas to the particulate filter when the determined temperature of the particulate filter is less than the predetermined temperature value. The predetermined temperature value may correspond to a temperature which is sufficiently high for regeneration of the particulate filter.

The control valve may comprise a biasing member for biasing the control valve to an open position or a closed position. The biasing member may comprise a spring member or a resilient biasing member. The control valve may be a one-way valve. The control valve may open when the manifold absolute pressure (MAP) is greater than the exhaust pressure (EXP). For example, a pressure differential across the control valve may overcome a spring force which biases the control valve to a closed position.

An actuator may be provided for selectively opening and/or closing the control valve. The actuator may be electromechanical. The actuator may be controlled in dependence on a control signal received from a controller. For example, the actuator may selectively open and close the control valve. The actuator may provide proportional control. The actuator may enable a valve lift to be controlled, for example to control a flow rate of the gas supplied to the particulate filter. The controller may be configured to monitor the temperature of the particulate filter. The controller may be configured to inhibit opening of the control valve when the determined temperature is less than the predetermined temperature value.

The control valve may be opened to introduce gas into the particulate filter to promote regeneration. The control valve may be closed to reduce or prevent the introduction of gas into the particulate filter, thereby retarding or preventing regeneration of the particulate filter.

The supply inlet may comprise an inlet port, for example. The supply inlet may be configured to introduce the gas into the exhaust conduit upstream of the particulate filter. Alternatively, the supply inlet may be configured to introduce the gas into an inlet portion of the particulate filter.

At least in certain embodiments, the catalyst and the particulate filter are arranged in series. The supply inlet may introduce the gas into the exhaust conduit between the catalyst and the particulate filter.

The gas supply inlet may be connected to a pressurised gas supply. The pressurised gas supply may be suitable for supplying the gas to the exhaust system at a pressure which is greater than the pressure of the exhaust gases in the exhaust conduit. The supply conduit may connect the supply inlet to the pressurised gas supply. The supply inlet may be a pressurised gas supply inlet for introducing gas at a higher pressure than that of the combustion gases in the exhaust system. In use, the supply inlet may be configured to introduce gas into the exhaust system at a pressure which is higher than the exhaust gas pressure in the exhaust system. The supply inlet may be connected to a pressurised gas supply. For example, the supply inlet may be connected to a pump.

At least in certain embodiments, the supply inlet may be connected to a secondary air system. For example, the supply conduit may connect the supply inlet to the secondary air system. Alternatively, the supply inlet may be a manifold boost system, such as a supercharger or a turbocharger associated with the engine.

In a variant, the supply inlet may be connected to an exhaust gas recirculation (EPR) conduit. The EGR conduit could be configured to supply the gases to supply inlet, for example when the manifold absolute pressure (MAP) is greater than the exhaust pressure (EXP).

The exhaust conduit may be configured to reduce the pressure of the exhaust gases in the region of the gas supply inlet. The exhaust system may comprise a constricted section for reducing the gas pressure in the exhaust conduit in the region of the supply inlet. The constricted section may establish the Venturi effect in the exhaust system to reduce the pressure of the exhaust gas. The constricted section may be disposed coincident with the supply inlet.

The control valve may be configured to supply gas to the particulate filter to control regeneration when the internal combustion engine is operating in an overrun state, for example in a fuel cut mode when the supply of fuel to one or more combustion chamber is inhibited. However, it is not a requirement of the present invention that the internal combustion engine is operating in an overrun state. At least in certain embodiments, the control valve may be configured to supply gas to the particulate filter to control regeneration during normal operation of the internal combustion engine, for example when fuel is supplied to one or more combustion chamber. At least in certain embodiments, the gas may be supplied to the particulate filter to regenerate the particulate filter when the internal combustion engine is operating to generate positive torque.

The catalyst may comprise or consist of a three-way catalyst. The gas may be introduced into the exhaust system downstream of the catalyst so as not to affect operation of the catalyst.

The gas may be air. The supply inlet may be configured to introduce air into the exhaust conduit.

The particulate filter may comprise or consist of a gasoline particulate filter. The exhaust system may be for a gasoline engine. The gasoline particulate filter may be active (catalytic); or may be non-active (non-catalytic).

According to a further aspect of the present invention there is provided a vehicle comprising an internal combustion engine and an exhaust system as described herein. The internal combustion engine may be a gasoline engine.

The supply inlet may be connected to a manifold boost system of the internal combustion engine. Alternatively, supply inlet may be connected to a secondary air injection system.

According to a further aspect of the present invention there is provided a controller for controlling the exhaust system described herein. The controller may be configured to control the control valve to control regeneration of the particulate filter, the controller being configured to:

determine a particulate loading of the particulate filter; and output a control signal to control the control valve to control regeneration of the particulate filter in dependence on the determined particulate loading.

The particulate loading of the particulate filter may be modelled, for example in dependence on operating parameters of the internal combustion engine. Alternatively, or in addition, the particulate loading may be determined in dependence on one or more sensor signal. For example, the particulate loading may be determined by measuring a pressure differential across the particulate filter.

According to a further aspect of the present invention there is provided a controller for controlling regeneration of a particulate filter disposed in an exhaust system for exhausting combustion gases from an internal combustion engine, the exhaust system comprising an control valve for controlling the introduction of gas into the exhaust system upstream of the particulate filter; the controller being configured to:

determine a particulate loading of the particulate filter; and     output a control signal to control the control valve to control the supply of air to the particulate filter in dependence on the determined particulate loading.

The controller may comprise an electronic processor; and an electronic memory device electrically coupled to the electronic processor and having instructions stored therein. The processor may be configured to access the memory device and execute the instructions stored therein such that it is operable to:

determine the particulate loading of the particulate filter; and     output the control signal to control regeneration of the particulate filter in dependence on the determined particulate loading.

The controller may be configured to compare the determined particulate loading to a predetermined first loading threshold. The control signal may comprise an open valve request to open the control valve in dependence on a determination that the particulate loading is greater than the first loading threshold. The control signal may comprise a close valve request to close the control valve in dependence on a determination that the particulate loading is less than the first loading threshold.

The controller may be configured to compare the determined particulate loading to a predetermined second loading threshold. The control signal may comprise a close valve request to close the control valve in dependence on a determination that the particulate loading is less than the second loading threshold.

The controller may be configured to control regeneration of the particulate filter to maintain a target particulate loading of the particulate filter. The target particulate loading may correspond to the particulate filter being part-loaded.

The controller may be configured to determine a temperature of the particulate filter. The output of the control signal may be controlled in dependence on the determined temperature. The control signal may comprise an open valve request to open the control valve in dependence on a determination that the temperature of the particulate filter is greater than a regeneration temperature value. The temperature of the particulate filter may be modelled, or may be measured by one or more temperature sensor. The controller may be configured to output the control signal to open the control valve to introduce gas into the exhaust system in dependence on a determination that the temperature of the particulate filter is greater than a regeneration temperature value.

According to a further aspect of the present invention there is provided a vehicle comprising a controller as described herein.

According to a further aspect of the present invention there is provided a method of controlling regeneration of a particulate filter disposed in an exhaust system for exhausting combustion gases from an internal combustion engine, the method comprising:

determining a particulate loading of the particulate filter; and     controlling the opening and closing of a control valve in dependence on the determined particulate loading to control the supply of air to the particulate filter to control regeneration.

The method may comprise comparing the determined particulate loading to a predetermined first loading threshold. The method may comprise opening the control valve in dependence on a determination that the particulate loading is greater than the first loading threshold.

The method may comprise comparing the determined particulate loading to a predetermined second loading threshold. The method may comprise closing the control valve in dependence on a determination that the particulate loading is less than the second loading threshold.

The method may comprise controlling regeneration of the particulate filter to maintain a target particulate loading of the particulate filter. The target particulate loading may correspond to the particulate filter being part-loaded.

The method may comprise determining a temperature of the particulate filter. The method may comprise controlling the opening of the control valve in dependence on the determined temperature. The method may comprise supplying gas to regenerate the particulate filter when the determined temperature of the particulate filter is greater than a predetermined temperature value. The method may comprise inhibiting the supply of gas to the particulate filter when the determined temperature of the particulate filter is less than the predetermined temperature value. The predetermined temperature value may correspond to a temperature which is sufficiently high for regeneration of the particulate filter.

It will be understood that various techniques may be employed to determine the particulate loading of the particulate filter. The controller may be configured to implement one or more of the following techniques to determine particulate loading of the particulate filter:

(i) measure the back-pressure before the particulate filter;

(ii) measure the delta-pressure across the particulate filter;

(iii) measure the electrical conductivity across the particulate filter;

(iv) measure the rate of temperature increase during regeneration;

(v) gas analysis sensor during regeneration (a rich burn implies high particulate loading);

(vi) measure attenuation of a radio wave signal transmitted through the particulate filter (a transmitter and a receiver are disposed at opposing ends of the particulate filter, the transmitter transmitting a (RF) signal through the particulate filter and the receiver receiving the (attenuated) signal); and     (vii) modelling of particulate loading and depletion.

At least in certain embodiments the particulate filter is a gasoline particulate filter (GPF).

According to a further aspect of the present invention there is provided a vehicle powertrain comprising a controller as described herein.

According to a further aspect of the present invention there is provided a non-transitory computer readable medium comprising computer readable instructions that, when executed by a processor, cause performance of a method as described herein.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A vehicle 100, a control system 201, a controller 104, a method 400 and a non-transitory computer readable medium 210 in accordance with an embodiment of the present invention is described herein with reference to the accompanying Figures.

Figure 1:
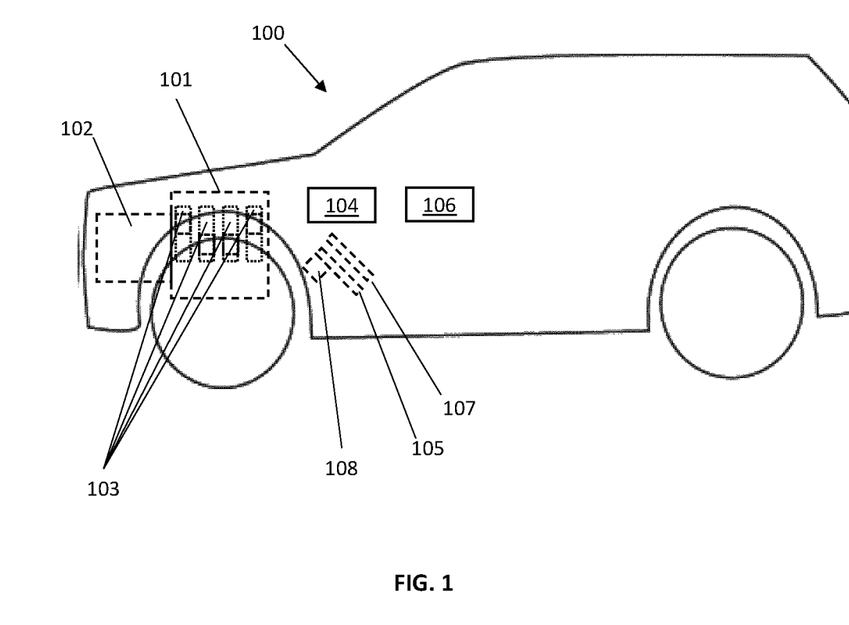
FIG. 1 shows a vehicle embodying a controller in accordance with an embodiment of the present invention.

With reference to FIG. 1, the vehicle 100 is a road vehicle in the form of a car. The vehicle 100 comprises an internal combustion engine 101 (referred to below as the engine 101) and a secondary torque source 102 for turning the engine 101 over to start it. The secondary torque source 102, in the present embodiment, is in the form of a belt integrated starter generator 102 configured to rapidly increase the rotational speed of the output of the engine 101 from zero when it is to be restarted.

In the present embodiment the engine 101 is a four stroke petrol (i.e. gasoline) engine comprising four cylinders 103, but it will be appreciated that other embodiments may comprise less than or more than four cylinders. The cylinders 103 form combustion chambers 103A in which fuel is combusted.

The vehicle 100 comprises an accelerator pedal 105, including an accelerator pedal sensor 108, and a brake pedal 107 to enable a user to control the speed of the vehicle 100.

The vehicle 100 also comprises a controller 104 in the form of an engine control unit (ECU) configured to control operation of the engine 101. Amongst other things, the controller 104 is arranged to control fuel injection into the cylinders 103 of the engine 101 in response to signals received from various components of the vehicle 100 including the accelerator pedal sensor 108 and a vehicle supervisory system 106 that is configured to receive user inputs indicative of user requests to switch on the vehicle 100 or switch off the vehicle 100. The supervisory system 106 may comprise a user operable switch and a smart key detection means, or an ignition key switch, or other means of enabling a user to provide indications that the engine 101 is to be started or stopped. A torque controller may function as a supervisory system.

Figure 2:
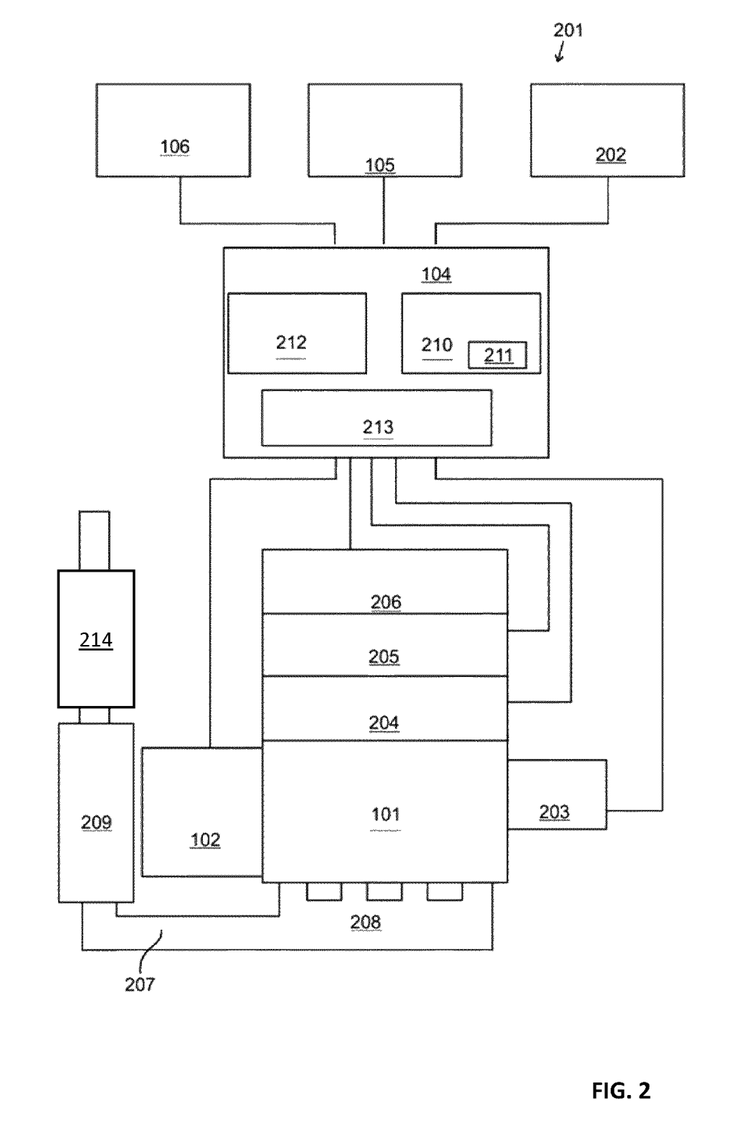
FIG. 2 shows a control system comprising a controller arranged to control operation of an engine of the vehicle.

The controller 104 forms a part of a control system 201, shown schematically in FIG. 2, which is arranged to control operation of the engine 101. As well as receiving input signals from the supervisory system 106 and the accelerator pedal sensor 108, the controller 104 is also arranged to receive input signals from a brake system 202 of the vehicle 100 indicative of user request that are input at the brake pedal 107 (shown in FIG. 1). It also receives input signals from a sensing device 203 arranged to sense the position of the crankshaft (not shown) of the engine 101. In the present embodiment the sensing device 203 comprises a pair of Hall Effect sensors that are positioned to detect the orientation of the flywheel (not shown) of the engine 101.

In response to received input signals, the controller 104 is configured to provide output signals to various components of the control system 201 that control operation of the engine 101, including: fuel injectors 204 for controlling the mass of fuel injected into the cylinders 103 of the engine 101; an ignition system 205 for igniting a fuel and air mixture within the cylinders 103; and a valve actuation means 206 for actuating intake valves (301 shown in FIG. 3) of the cylinders 103 of the engine 101. In the present embodiment the valve actuation means 206 is a continuous variable valve lift (CVVL) system 206, but in alternative embodiments the valve actuation means 206 may comprise a discrete variable valve lift system. However, in either case, in dependence on signals received from the controller 104, the valve actuation means 206 is capable of opening intake valves of the cylinders 103 during respective intake strokes but also capable of continuously maintaining the intake valves of the cylinders 103 in a closed position while the engine 101 is rotated through two or more revolutions.

During its operation, exhaust gases are emitted from the engine 101 via an exhaust system 207. The exhaust system 207 comprises an exhaust manifold 208 and a three-way catalytic converter 209. The exhaust system 207 also comprises a particulate filter 214 for reducing particle emissions. The particulate filter 214 is a gasoline particulate filter (GPF) in the present embodiment. The GPF 214 may, for example, comprise a wall-flow substrate for trapping particulates present in the exhaust gases following the combustion process in the engine 101. The GPF 214 is regenerated periodically to remove the trapped particulates, referred to herein as soot. The regeneration of the GPF 214 may be a passive regeneration or an active regeneration. Regeneration occurs when the particulate filter possesses a loading of particulates providing there is oxygen gas present and providing that the filter is sufficiently hot (typically a temperature greater than or equal to 600 degrees centigrade). It will be understood that the exhaust system 207 may comprise a plurality of the catalytic converters 209. Moreover, the GPF 214 may also function as a catalytic converter (often called an 'active' GPF).

The exhaust system 207 comprises at least one exhaust conduit 215 connected to the exhaust manifold 208 and configured to convey exhaust gases from the engine 101. The three-way catalytic converter 209 and the GPF 214 are arranged in series in the exhaust conduit 215. The exhaust gases from the engine 101 are introduced into the three-way catalytic converter 209 and then supplied to the GPF 214.

Figure 4:
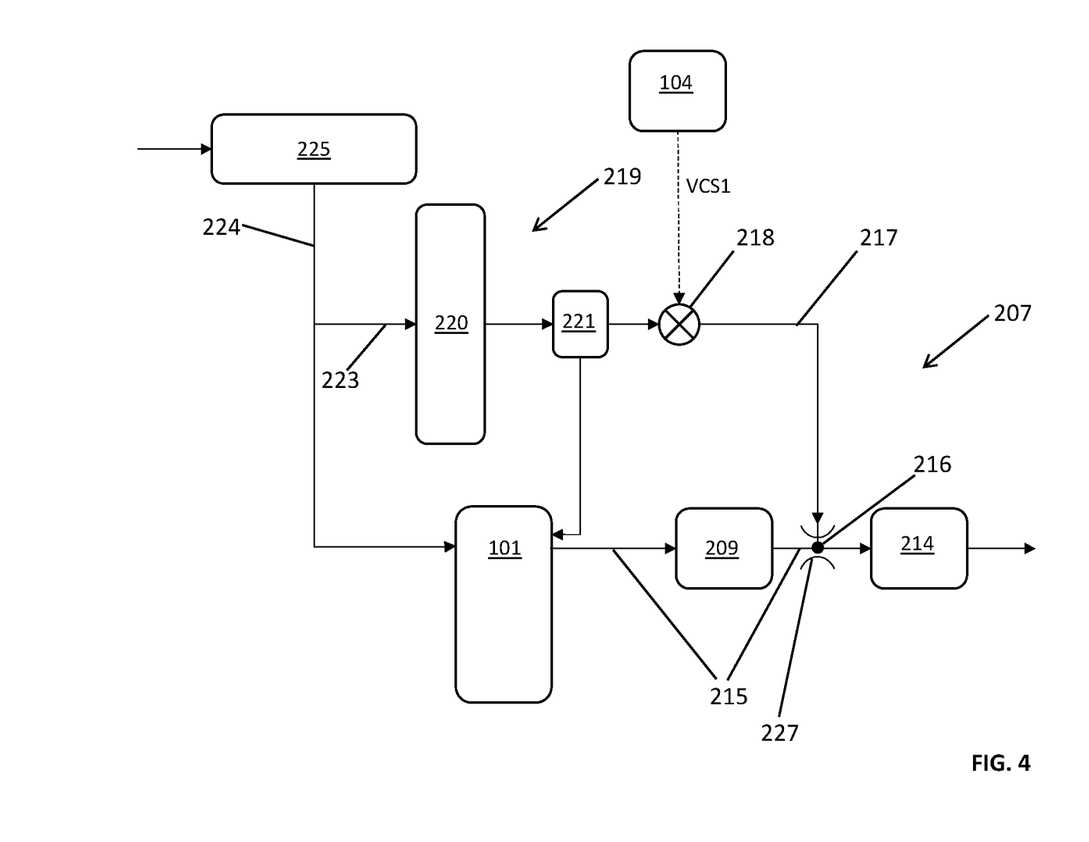
FIG. 4 shows a secondary air system configured to supply pressurised air to supply line to control regeneration of a particulate filter.

As shown in FIG. 4, the exhaust system 207 in the present embodiment comprises a GPF supply inlet 216 for introducing air into the exhaust system 207 between the three-way catalytic converter 209 and the GPF 214. The GPF supply inlet 216 may, for example, comprise an inlet port or a nozzle for introducing air into an interior of the exhaust conduit 215. In the present embodiment, the GPF supply inlet 216 is disposed in the exhaust conduit 215 proximal to an inlet of the GPF 214. In a variant, the GPF supply inlet 216 may be disposed in the inlet of the GPF 214. The GPF supply inlet 216 is disposed downstream of the three-way catalytic converter 209 and upstream of the GPF 214. The GPF supply inlet 216 may, for example, be disposed in the exhaust conduit 215 or at an (upstream) inlet of the GPF 214. The GPF supply inlet 216 is configured to introduce air into the exhaust system 207 to promote regeneration of the GPF 214. The flow of air is facilitated by a pressure difference such that the air of the GPF supply inlet 216 is at a higher pressure than the exhaust gas within the exhaust conduit 215. The pressure difference may be established by reducing the pressure within the exhaust conduit 215 to below that of the air in the GPF supply inlet. This may be achieved by means of a venturi effect for reducing pressure of the flowing gas in the region of the inlet port or nozzle of the GPF supply inlet. In order to reduce the pressure of the exhaust gases in the exhaust system 207, the exhaust conduit 215 may optionally comprise a restricted region (or a choke) 227, for example disposed in the region of the GPF supply inlet 216. The restricted region 227 may create a Venturi effect which reduces the exhaust gas pressure. This may facilitate the introduction of gases into the exhaust conduit 215. Additionally, or alternatively, the GPF supply inlet 216 is connected to a supply conduit 217 for supplying air to the GPF supply inlet 216, and so provide a higher pressure in the air of the GPF supply inlet 216 than the pressure of the exhaust gas within the exhaust conduit 215. A regeneration control valve 218 is provided for controlling the supply of air to the GPF supply inlet 216. In the present embodiment, the regeneration control valve 218 is disposed in the supply conduit 217. The regeneration control valve 218 is actuated in dependence on a valve control signal VCS1 received from the controller 104. The regeneration control valve 218 may comprise an electromechanical valve, for example a solenoid valve. Alternatively, a drive mechanism may be provided for controlling operation of the regeneration control valve 218. A flow restrictor may be provided in the supply conduit 217. The flow restrictor could be variable, for example to control the supply rate of the air to the GPF supply inlet. The regeneration control valve 218 may be an ON/OFF type valve selectively configurable in an open state or a closed state. Alternatively, the regeneration control valve 218 may be a variable lift valve for controlling the flow rate of the air supplied to the GPF supply inlet 216. The operation of the regeneration control valve 218 is described in more detail herein.

The supply conduit 217 in the present embodiment is configured to supply air to the GPF supply inlet 216 at a pressure greater than that of the gases in the exhaust system 207. This establishes a positive pressure differential and promotes the flow of air into the exhaust system 207 for supply to the GPF 214. The supply conduit 217 in the present embodiment is connected to a secondary air system 219. The secondary air system 219 is configured to introduce pressurized air into the exhaust gases expelled from the engine 101 to promote burning of unburnt fuel. The secondary air system 219 may, for example, introduce a supply of secondary air into an outlet port of the engine 101 or the exhaust manifold 208. The secondary air system 219 comprises a secondary air pump 220, a secondary air valve 221 and a secondary air supply conduit 222. The secondary air pump 220 comprises a secondary air inlet 223 connected to a (primary) air intake 224 for the engine 101. An air filter 225 is provided to filter the air supplied to the air intake 224 and the secondary air pump 220. The supply conduit 217 is connected to an outlet 226 of the secondary air system 219 on a pressure side of the secondary air pump 220. It will be understood that the supply conduit 217 may be connected to different pressurised air supplies. For example, the supply conduit 217 may be connected to an inlet manifold (pressure) boost system, such as a turbocharger or a supercharger. Alternatively, or in addition, a dedicated air pump (not shown) may be provided for supplying pressurised air to the supply conduit 217.

During normal operation of the engine 101, when it is producing combustion torque, the controller 104 is configured to provide output signals to the fuel injectors 204, the ignition system 205 and the valve actuation means 206 to cause intake of air into the cylinders 103, injection of fuel into the cylinders 103 and ignition of the fuel at specific times within the four stroke combustion cycle of the cylinders 103. The engine 101 is a direct injection internal combustion engine 101 and therefore, typically, for each cylinder 103, the intake valve (or the intake valves, in embodiments where there are several) are opened and closed during an intake stroke, and fuel is injected into the cylinder 103 during the intake stroke so that the injected fuel is mixed with air drawn in past the open intake valves. The ignition system 205 then ignites the fuel and air mixture towards the end of a compression stroke so that the mixture burns during the following power stroke. The combustion products are then exhausted from the engine 101 in the following exhaust stroke before the cycle begins again with a further intake stroke. The timing of the fuel injection, ignition and intake valve opening and closing are scheduled by the controller 104 in dependence on timing signals received from the sensing device 203.

If the engine 101 is not running and a signal is received indicating that the engine 101 is required to produce combustion torque, the controller 104 may provide an output signal to the secondary torque means 102 to cause it to turn the engine 101 over and provide signals to the valve actuation means 206, the fuel injectors 204 and ignition system 205 to cause the engine to be started.

If the engine 101 is running, and a fuel cut signal is received indicating that fuel provided to the engine 101 is to be stopped, the controller 104 co-ordinates stopping of fuel supply to the engine 101 and stopping of ignition of the air-fuel mixture so that the engine 101 stops producing combustion torque. In addition, as will be described in further detail below, the controller 104 also co-ordinates closing of the intake valves of the engine 101 to prevent oxygen reaching the three-way catalytic converter and causing oxidation of the catalyst.

In the present embodiment, the controller 104 is configured to stop and start the engine 101 in accordance with requirements for torque to be produced by the engine. Thus, a fuel cut signal received at the controller 104 could be received from the supervisory system 106 which has received a user input indicating that the engine 101 is to be switched off, but alternatively, the fuel cut signal may be received from the accelerator pedal sensor 108 indicating that the user has released the accelerator pedal 105 and no torque is required to be produced by the engine 101, or alternatively the fuel cut signal may be received by the controller 104 from the brake system 202, which has received a user input at the brake pedal 107 indicating that the vehicle 100 is to slow down, or alternatively the fuel cut signal may be received by the controller 104 from another device or system such as a vehicle supervisory controller (VSC), an advanced driver-assistance system (ADAS), or a similar supervising or arbitrating controller such as a torque controller.

Similarly, when the engine 101 is not producing torque, the controller 104 is configured to cause reinstatement of fuel supply to the engine 101 in dependence on receiving a request signal indicating that positive engine torque is required. For example, the request signal may be generated by the accelerator pedal sensor 108, following a period in which the engine 101 has not been running at all, or at a time when the engine is still turning over due to momentum after it has previously been run.

In the present embodiment, the controller 104 comprises a memory device 210, which stores instructions 211, and a processor 212 configured to access the memory device 210 and execute the stored instructions 211 so that the processor 212 is operable to control the secondary torque source 102, the valve actuation means 206, the ignition system 205 and the fuel injectors 204. The controller 104 also comprises an input/output means 213 of the controller 104 to receive input signals from, and provide output signals to, other components of the vehicle 100. The input/output means 213 may include a transceiver for providing data communication over a data bus, such as a CAN (controller area network) bus.

Figure 3:
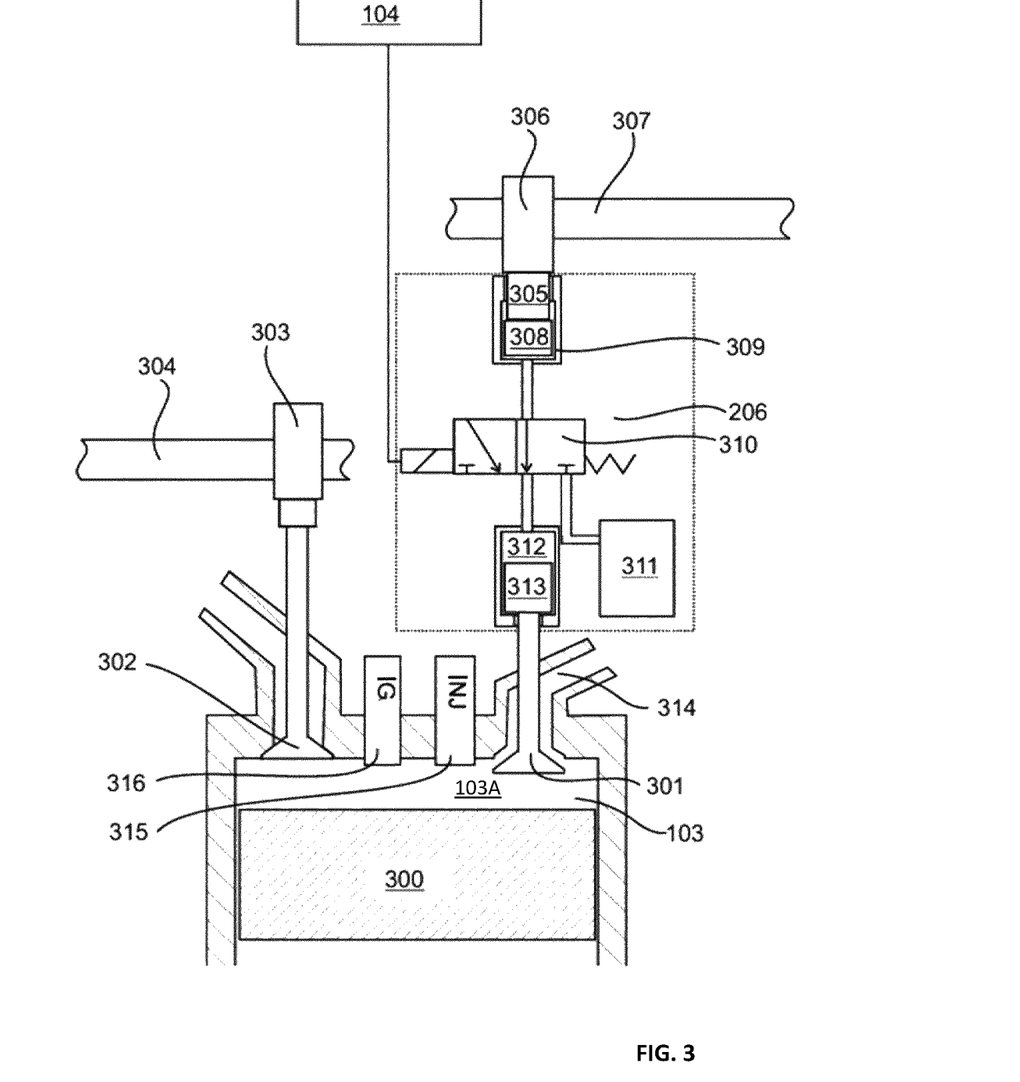
FIG. 3 shows details of a valve actuation means of the control system.

Further details of the valve actuation means 206 of the system 201 is illustrated in FIG. 3, which shows one of the cylinders 103 of the engine 101 containing a piston 300. FIG. 3 also shows the mechanisms by which an intake valve 301 and an exhaust valve 302 of the cylinder 103 are actuated. It should be understood that although only one cylinder 103 with one intake valve 301 is illustrated in FIG. 3, the intake valves 301 of the other cylinders 103 may be actuated in a similar manner. Also, in other embodiments, each cylinder 103 may have more than one intake valve 301 and where the present specification refers to the operation of the intake valve of a cylinder, it also applies to the operation of all of the intake valves of a cylinder that has multiple intake valves. A reference to an intake valve 301 of a cylinder 103 being open, opening, being closed or closing, should be understood to be a reference to all of the intake valves 301 of a cylinder 103 being open, opening, being closed or closing in respect of an embodiment with multiple intake valves 301 for each cylinder 103.

In the present embodiment, the valve actuation means 206 comprises a hydraulic system of a known type which is arranged to actuate only the intake valves 301 of the engine 101. The exhaust valves 302 are actuated by direct mechanical interaction with a cam 303 on a camshaft 304, but in an alternative embodiment, the exhaust valves 302 may also be actuated by a continuous variable valve lift (CVVL) system in a similar manner to the intake valves 301.

The valve actuation means 206 comprises a cam follower 305 which is arranged to be actuated by a cam 306 located on a camshaft 307 of the engine 101. When actuated, the cam follower 305 actuates a piston 308 in a master cylinder 309 of the hydraulic system. The master cylinder 309 is hydraulically connectable via a solenoid valve 310 to a reservoir means 311 and a slave cylinder 312, which contains a piston 313. In the present embodiment, the solenoid valve 310 is biased so that connection is normally provided between the master cylinder 309 and the slave cylinder 312, while the reservoir means 311 is isolated from the master cylinder 309, and when the solenoid valve 310 is actuated, in response to a signal from the controller 104, the master cylinder 309 is connected to the reservoir means 311 and isolated from the slave cylinder 312.

The piston 313 of the slave cylinder 312 is arranged to actuate the intake valve 301. When the intake valve 301 is actuated, as illustrated in FIG. 3, the intake valve 301 is displaced from an intake port 314 of the cylinder 103 to allow air to be drawn into the cylinder 103.

During normal operation of the engine 101, the solenoid valve 310 provides connection between the master cylinder 309 and the slave cylinder 312, at least for a part of the period in which the cam 306 actuates the piston 308 of the master cylinder 309, during the intake stroke of the piston 300. Consequently, the piston 313 of the slave cylinder 312 is hydraulically actuated and pushes the intake valve 301 to an open position, as shown in FIG. 3. As the cam 306 is further rotated, it releases its pressure applied to the piston 308, allowing hydraulic fluid to return to the master cylinder 309, and the intake valve 301 to return to a closed position in which it closes the intake port 314.

However, in response to a signal from the controller 104, the solenoid valve 310 may be moved to connect the master cylinder 309 to the reservoir means 311 during the whole of the intake stroke of the piston 300, so that actuation of the piston 308 in the master cylinder 309 cannot cause actuation of the piston 313 in the slave cylinder 312. Consequently the intake valve 301 remains in the closed position, so that no air is able to enter the cylinder 103 through the intake port 314 during the whole of the intake stroke.

As illustrated in FIG. 3, a fuel injector 315 is positioned to provide an injection of fuel directly into the cylinder 103, and an ignition device 316, such as a spark plug, is provided to ignite fuel and air mixtures present within the cylinder 103.

In alternative embodiments, the valve actuation means 206 may comprise another type of variable valve lift system, such as an electrical system comprising solenoids or electric motors that are arranged to actuate the intake valves 301 of the engine 101 directly.

Figure 5:
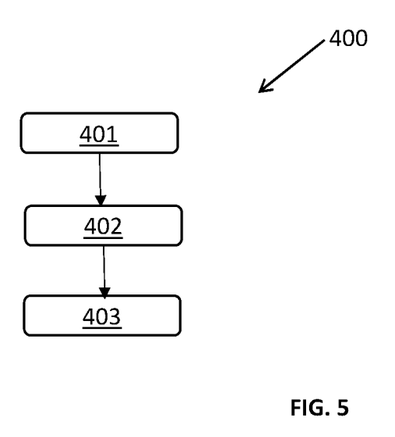
FIG. 5 shows a first flowchart illustrating a method of controlling an internal combustion engine.

A flowchart illustrating a method 400 of controlling an internal combustion engine 101 performable by the controller 104 is shown in FIG. 5. At block 401 a first request signal is received that is indicative of a request to cut fuel to the internal combustion engine 101. For example, the request signal may be received by the controller 104 from the supervisory system 106, which has generated the signal in response to receiving a user input indicating that the engine should be stopped, or the signal may be received from the brake system 202 indicating that the user of the vehicle 100 has applied pressure to the brake pedal 107 indicating that positive engine torque is not currently required. Alternatively, or in addition, the supervisory system 106 may generate the first request signal in dependence on a reduction in the requested torque output of the engine 101 when the vehicle is in motion. The reduction in the torque output may be received following a driver of a vehicle releasing an accelerator pedal or lifting an accelerator pedal. The requested torque output may, for example, be zero or negative. As the vehicle is in motion, the engine 101 enters an overrun state and, if connected to the driveline, may then provide negative or braking torque to the driveline via an engine braking effect.

At block 402 of the method 400, an intake valve 301 of a cylinder 103 of the internal combustion engine 101 is caused to remain closed for the current revolution of the internal combustion engine and revolutions of the internal combustion engine immediately following the current revolution of the internal combustion engine in dependence on the intake valve being closed at the time of receiving the first request signal. In the embodiment of FIG. 3, unless it is activated, the solenoid valve 310 is configured to provide hydraulic connection between the master cylinder 309 and the slave cylinder 312. Consequently, the process of block 402 may be achieved by providing a signal to the solenoid valve 310 to cause it to isolate the slave cylinder 312 from the master cylinder 309 and provide a hydraulic connection between the master cylinder 309 and the reservoir means 311.

In an alternative embodiment, in which the solenoid valve 310 is configured to provide connection between the master cylinder 309 and the reservoir means 311 unless the solenoid valve 310 is activated, the process of block 402 may be achieved by the controller 104 not providing a signal to the solenoid valve 310 that would cause it to connect the master cylinder 309 to the slave cylinder 312 during the intake stroke of the piston 300.

The GPF 214 is regenerated periodically to remove the trapped particulates, typically referred to as soot. The regeneration of the GPF 214 may be a passive regeneration or an active regeneration.

The controller 104 is configured to monitor a particulate (soot) loading of the GPF 214 (referred to herein as the 'GPF particulate loading'). The GPF particulate loading may, for example, be indicated as a proportion (for example, a percentage) of the maximum loading capacity of the GPF 214. In the present embodiment, the controller 104 is configured to model the GPF particulate loading in dependence on the operating conditions of the engine 101. The controller 104 may determine the GPF particulate loading by modelling soot production in dependence on the operating parameters of the engine 101. The production of soot by the engine 101 may be modelled in dependence on empirical data. The controller 104 may integrate soot production with respect to time to estimate a current loading. As described herein, the GPF 214 is regenerated periodically to reduce the GPF particulate loading. The determination of the loading of the GPF 214 may also take into account regeneration of the GPF 214 (passive regeneration and/or active regeneration). The GPF particulate loading is modelled during regeneration, for example in dependence on a measurement of the oxygen content of the exhaust gases downstream of the GPF 214 during or after regeneration. The exhaust system 207 may comprise an oxygen sensor, such as a Heated Exhaust Gas Oxygen Sensor, to monitor oxygen levels.

In a variant, the controller 104 may determine the GPF particulate loading in dependence on the output of one or more sensor. For example, one or more pressure sensor may be provided to measure the pressure of the exhaust gas in the exhaust system 207 at an inlet and/or an outlet of the GPF 214. A pressure differential across the GPF 214 may be determined in dependence on the inlet pressure and the outlet pressure measured by inlet and outlet pressure sensors respectively. The loading of the GPF 214 is directly proportional to the pressure differential across the GPF 214. A large pressure differential is indicative of a high loading of the GPF 214; and a low pressure differential is indicative of a low loading of the GPF 213. The GPF particulate loading may be determined in dependence on the determined pressure differential across the GPF 214. In a variant. the inlet pressure and/or the outlet pressure of the GPF 214 could be modelled. For example, the inlet pressure could be modelled in dependence on one or more operating parameters of the engine 101. Alternatively, or in addition, the inlet pressure and/or the outlet pressure may be modelled in dependence on pressure measurements upstream or downstream of the GPF 214, for example before or after other aftertreatment systems in the exhaust system 207.

The controller 104 is configured to control the regeneration control valve 218 in dependence on the GPF particulate loading. The controller 104 is configured to monitor the GPF particulate loading to determine when the GPF particulate loading is less than a first loading value; and/or greater than a second loading value. The first loading value and the second loading value are different from each other and define a target load range for the GPF 214. The first loading value and the second loading value correspond to respective upper and lower particulate loadings for the GPF 214. The first loading value in the present embodiment corresponds to the maximum load capacity of the GPF 214. In a variant, the first loading value may be less than the maximum load capacity of the GPF 214. The second loading value is greater than zero. It has been determined that the GPF 214 may be better at filtering particles from the exhaust gases under partial load conditions than under zero load conditions. It is believed that this may be a result of the particulates trapped in the GPF 214 performing additional filtration of the exhaust gases and trapping further particles. The controller 104 may optionally define a third loading value for the GPF particulate loading. The third loading value is greater than zero and less than the second loading value. particulate loading of the corresponding to a minimum particulate loading of the GPF 214. The loading values in the present embodiment are predefined. The first, second and third loading values may, for example, be determined with reference to empirical data.

The regeneration control valve 218 controls the supply of air to the GPF 214 from the secondary air system 219. The air supplied from the secondary air system 219 is oxygen rich and promotes regeneration of the GPF 214. The controller 104 is configured to control the opening and closing of the regeneration control valve 218 to control the supply of air to the GPF 214, thereby controlling regeneration of the GPF 214. Increasing the supply of air to the GPF 214 promotes regeneration; and decreasing the supply of air to the GPF 214 retards regeneration. The controller 104 is configured to open the regeneration control valve 218 to increase the supply air to the GPF 214 to promote regeneration when the determined GPF particulate loading is greater than the first loading value. The controller 104 is configured to close the regeneration control valve 218 to decrease the supply of aid to the GPF 214 to suppress or inhibit regeneration when the determined GPF particulate loading is less than the second loading value. At least in certain embodiments, the controller 104 is configured to provide additional control functions when the determined GPF particulate loading is less than or equal to the third loading value. The operation of the controller 104 to control regeneration of the GPF 214 will now be described in greater detail.

As outlined above, the first request signal is received that is indicative of a request to cut fuel to the internal combustion engine 101. In dependence on the first request signal, the controller 104 co-ordinates stopping of fuel supply to the engine 101 and stopping of ignition of the air-fuel mixture. It has been determined that there may be an opportunity at least partially to regenerate the GPF 214 while the supply of fuel to the engine 101 is stopped. The controller 104 in the present embodiment is configured to control the opening and closing of the regeneration control valve 218 to control the supply of air to the GPF supply inlet 216, thereby controlling the supply of air to the GPF 214. By controlling the operation of the regeneration control valve 218, the controller 104 controls the supply of air to the GPF 214, thereby controlling regeneration of the soot trapped in the GPF 214, providing the GPF 214 is sufficiently hot to commence regeneration. The controller 104 can open (or increase opening of) the regeneration control valve 218 to increase the supply of oxygen to the GPF 214, thereby promoting regeneration. The controller 104 can close (or reduce opening of) the regeneration control valve 218 to decrease the supply of oxygen to the GPF 214. The reduced supply of oxygen to the GPF 214 may slow or suppress regeneration of the GPF 214.

The first request signal may be generated when the engine 101 enters an overrun state. The first request signal in this scenario is an overrun request signal. The operation of the controller 104 in this application will now be described. In dependence on receipt of the first request signal, the controller 104 is configured to determine the GPF particulate loading using one or more of the techniques described herein. The controller 104 compares the determined GPF particulate loading to the first and second loading values. If the GPF particulate loading is determined to be greater than the first loading value, the controller 104 is configured to perform a fuel cut to stop the introduction of fuel during the next operating cycle. The controller 104 also controls the ignition system 205 to inhibit ignition during the following power stroke. In dependence on the determination that the GPF particulate loading is greater than the first loading value, the controller 104 opens the regeneration control valve 218 to supply air to the GPF 214 via the GPF supply inlet 216. The air supplied through the GPF supply inlet 216 has a relatively high oxygen content (compared to the gases in the exhaust system 207). The increased supply of oxygen to the GPF 214 promotes regeneration. The controller 104 may optionally also make a determination of the temperature of the GPF 214. The controller 104 may be configured to open the GPF supply inlet 216 to supply air to the engine 101 if the determined temperature of the GPF 214 is greater than a temperature value sufficient for regeneration to occur. The temperature of the GPF 214 may be measured or may be modelled, for example in dependence on one or more operating conditions. While the engine 101 remains in the overrun state, the controller 104 may determine the GPF particulate loading to identify changes while regeneration is ongoing. The reductions in the GPF particulate loading may, for example, be modelled for regeneration while the engine 101 is in the overrun state and the supply of fuel is cut. The controller 104 may monitor the determined GPF particulate loading with respect to the second loading value. The controller 104 maintains the regeneration control valve 218 open during the overrun state when the determined GPF particulate loading is greater than the second loading value. The controller 104 closes the regeneration control valve 218 when the determined GPF particulate loading is less than the second loading value. The supply of air to the GPF 214 from the GPF supply inlet 216 is thereby inhibited and regeneration of the GPF 214 is suppressed or inhibited. The engine 101 continues to operate in the overrun state with the intake valves 301 closed and fuel cut such that fuel is not injected. The controller 104 is configured to maintain this operating mode until a second request signal is received to reinstate the supply of fuel to the engine 101 and to exit the overrun state. The second request signal may, for example, be generated in dependence on a positive torque request to control the engine 101 to generate a positive torque.

In the above scenario, the controller 104 is configured to close the regeneration control valve 218 when the determined GPF particulate loading is less than the second loading value. The oxygen available in the exhaust system 207 may be sufficient to sustain regeneration after the intake valves 301 are closed. The regeneration of the GPF 214 may be monitored by an oxygen sensor, such as a Heated Exhaust Gas Oxygen (HUGO) sensor. This may enable regeneration of the GPF 214 to continue after the intake valve 301 is closed. The ongoing regeneration may, for example, be identified by monitoring the temperature of the GPF 214. The controller 104 continues to model the GPF particulate loading. The controller 104 may revise the model to reflect a reduced rate of regeneration caused by a reduction in the available oxygen in the GPF 214; and/or a reduced soot production caused by the fuel cut. The controller 104 monitors the determined GPF particulate loading with respect to the third loading value. If the controller 104 determines that the GPF particulate loading decreases to a value less than or equal to the third loading value, the controller 104 is configured to cause reinstatement of the fuel supply to the engine 101. The controller 104 may be configured to maintain the intake valves 301 in the closed position and continue operation of the engine 101 in the overrun state. Alternatively, the controller 104 may be configured also to open the intake valves 301, thereby ending the overrun state.

Figure 6:
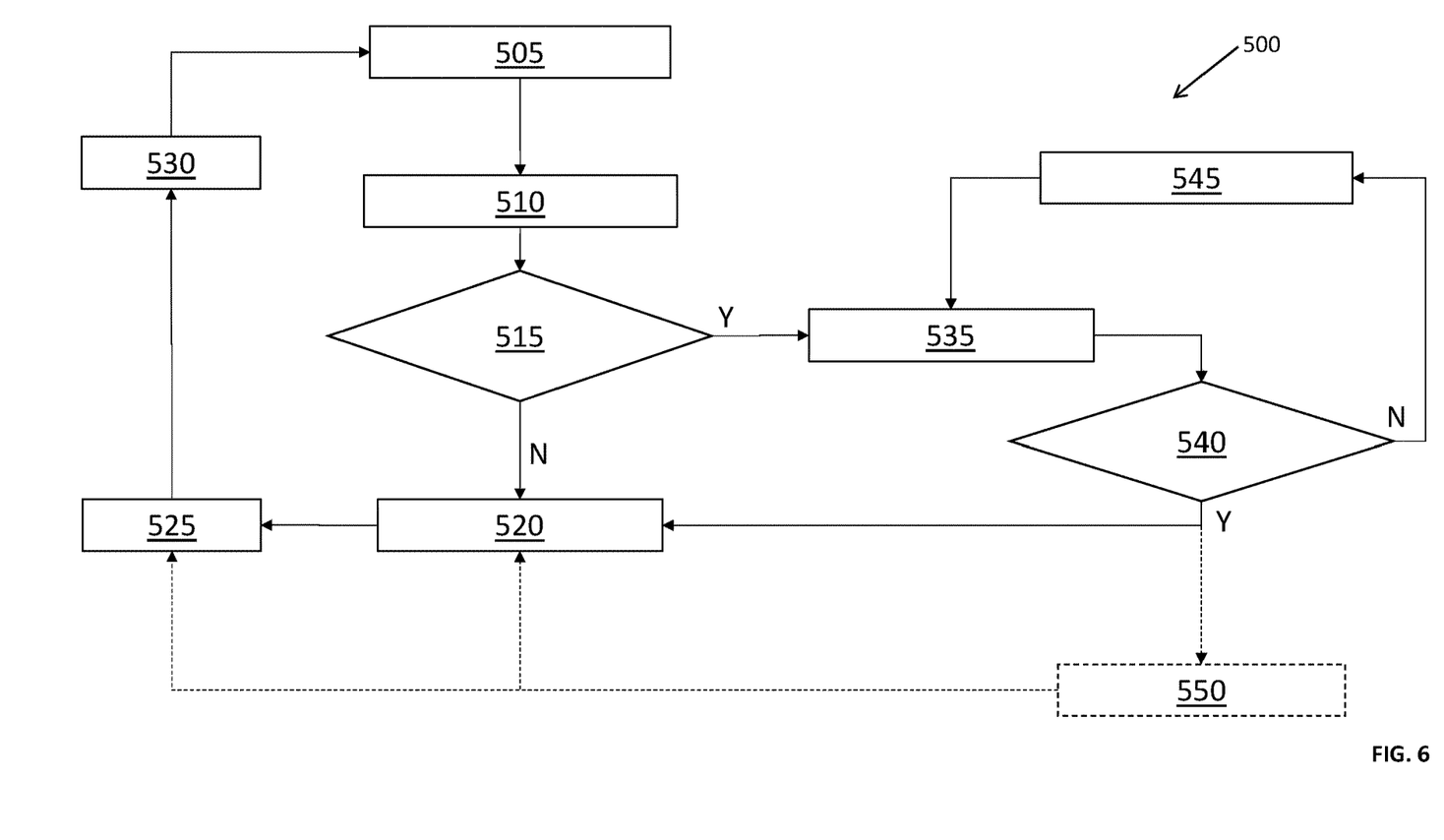
FIG. 6 shows a second flowchart illustrating a method of controlling the internal combustion engine in accordance with an embodiment of the present invention.

A second block diagram 500 representing operation of the controller 104 is shown in FIG. 6. The first request signal is received to initiate operation of the engine 101 in an overrun state (BLOCK 505). The first request signal comprises a fuel cut request. The controller 104 monitors the GPF particulate loading (BLOCK 510). It will be understood that monitoring of the GPF particulate loading may occur before receipt of the first request signal. A first check is performed to determine if the GPF particulate loading is greater than the first loading value (BLOCK 515). If the GPF particulate loading is less than the first loading value, the controller 104 closes the intake valves 301 and requests a fuel cut to implement the overrun state (BLOCK 520). The controller 104 closes the regeneration control valve 218 to inhibit the supply of air to the GPF supply inlet 216. In this condition there is no regeneration. The controller 104 maintains the intake valves 301 and the GPF supply inlet 216 closed and maintains the fuel cut until receipt of a second request is received to terminate the overrun state (BLOCK 525). The controller 104 continues to operate (BLOCK 530). The process is repeated following receipt of another first request signal to operate the engine 101 in the overrun state.

If the check (BLOCK 515) determines that the GPF particulate loading is greater than the first loading value, the controller 104 is configured to implement a modified control strategy to implement the overrun state. The controller 104 requests a fuel cut to inhibit the supply of fuel to the engine 101. Since the GPF particulate loading is greater than the first loading value, the controller 104 is configured to open the regeneration control valve 218 to supply air to the GPF supply inlet 216 to promote regeneration (BLOCK 535). The engine 101 operates in the overrun state with the fuel cut. The intake valves 301 of the engine 101 may be in an open state or a closed state. Air is supplied to the GPF 214 through the GPF supply inlet 216. The air supplied through the GPF supply inlet 216 is oxygen rich and promotes regeneration of the GPF 214 whereby the trapped particulates (soot) are burnt. A second check is performed to determine if the GPF particulate loading is less than the second loading value (BLOCK 540). If the GPF particulate loading is greater than the second loading value, the controller 104 continues to monitor the GPF particulate loading (BLOCK 545); and maintains the regeneration control valve 218 open and the fuel cut (BLOCK 535). If the GPF particulate loading is less than the second loading value, the controller 104 closes the regeneration control valve 218 (BLOCK 520). The controller 104 maintains the regeneration control valve 218 closed and maintains the fuel cut until receipt of a second request to terminate the overrun state (BLOCK 525). The controller 104 continues to operate (BLOCK 530). Optionally, the second check (BLOCK 540) may comprise determining if the GPF particulate loading is less than the third loading value. If the GPF particulate loading is less than the third loading value, the controller 104 reinstates the supply of fuel to the engine 101 (BLOCK 550). The controller 104 maintains the regeneration control valve 218 closed and maintains the fuel cut (BLOCK 525). The reinstatement of the supply of fuel may be appropriate to reduce or halt regeneration of the GPF 214. Alternatively, the controller 104 may terminate the overrun state (BLOCK 525).

The controller 104 may be configured to determine a temperature of the GPF 214. The controller 104 may be configured to control operation of the regeneration control valve 218 in dependence on the temperature of the GPF 214. For example, the controller 104 may open the regeneration control valve 218 only if the determined temperature is greater than a value suitable for regeneration to occur (typically greater than 600° C.). The controller 104 may close the regeneration control valve 218 if the determined temperature is less than the temperature value. The temperature value may be predefined. For example, the temperature value may be predefined as 600° C. The controller 104 may model the temperature of the GPF 214, for example in dependence on one or more operating parameters of the engine 101. Alternatively, or in addition, a temperature sensor may be provided for measuring the temperature of the GPF 214.

At least in certain embodiments, the exhaust system 207 can be selectively configured to supply air to the GPF 214 to promote regeneration. The air is introduced into the exhaust system 207 downstream of the three-way catalytic converter 209. This enables the supply of air to regenerate the GPF 214 without passing through the three-way catalytic converter 209. The regeneration of the GPF 214 has been described with particular reference to the engine 101 operating in an overrun state. However, the method and apparatus described herein are not restricted in this respect. The regeneration of the GPF 214 may be performed provided air is available for supply to the GPF 214. The GPF 214 may be regenerated without requiring operation of the engine 101 in an overrun state. Indeed, the method and apparatus described herein may be applied to an engine 101 which is not configured to operate in an overrun state. Alternatively or additionally the method and apparatus described herein may be applied to an engine 101 which is stopped. The GPF 214 may be regenerated when the engine 101 is not operating. This could be implemented in a hybrid vehicle, for example to regenerate the GPF 214 when an electric traction motor is operating to generate a drive torque to propel the vehicle 100. It may also be used to regenerate the GPF 214 of a Range Extender engine as used in a series hybrid vehicle. In a series hybrid the engine torque is used primarily or solely to drive an electric generator. Other applications are also contemplated. At least in certain embodiments, this may enable regeneration to be performed over a wider envelope of operating conditions. At least in certain embodiments, the regeneration of the GPF 214 may be performed during positive torque conditions.

It will be appreciated that various changes and modifications can be made to the present invention without departing from the scope of the present application.

FIG. 2 LABELS

101 INTERNAL COMBUSTION ENGINE
102 SECONDARY TORQUE SOURCE (OPTIONAL)
104 CONTROLLER
105 ACCELERATOR PEDAL SENSOR
106 SUPERVISORY SYSTEM
202 BRAKE SYSTEM
203 SENSING DEVICE
204 FUEL INJECTORS
205 IGNITION SYSTEM
206 VALVE ACTUATION MEANS (CVVL)
209 CATALYTIC CONVERTER
210 MEMORY DEICE
212 PROCESSOR
213 INPUT/OUTPUT MEANS
214 PARTICULATE FILTER

First Flow Chart 400 Labels

401 RECEIVE A FIRST REQUEST SIGNAL INDICATIVE OF A REQUEST TO CUT FUEL TO AN INTERNAL COMBUSTION ENGINE
402 CAUSE AN INTAKE VALVE OF A CYLINDER OF THE INTERNAL COMBUSTION ENGINE TO REMAIN CLOSED FOR THE CURRENT REVOLUTION OF THE INTERNAL COMBUSTION ENGINE AND REVOLUTION(S) OF THE INTERNAL COMBUSTION ENGINE IMMEDIATELY FOLLOWING THE CURRENT REVOLUTION OF THE INTERNAL COMBUSTION ENGINE IN DEPENDENCE ON THE INTAKE VALVE BEING CLOSED AT THE TIME OF RECEIVING THE FIRST REQUEST SIGNAL
403 CAUSE INJECTION OF FUEL INTO THE CYLINDER AND SUBSEQUENTLY CAUSE THE INTAKE VALVE TO REMAIN CLOSED FOR REVOLUTION(S) OF THE INTERNAL COMBUSTION ENGINE IMMEDIATELY FOLLOWING THE NEXT CLOSING OF THE INTAKE VALVE IN DEPENDENCE ON THE INTAKE VALVE BEING OPEN AT THE TIME OF RECEIVING THE FIRST REQUEST SIGNAL OR IF A NEXT OPENING OF THE INTAKE VALVE HAS ALREADY BEEN SCHEDULED AT THE TIME OF RECEIVING THE FIRST REQUEST SIGNAL AND SAID NEXT OPENING OF THE INTAKE VALVE IS TO BE PERFORMED

Second Flow Chart 500 Labels

505 OVER-RUN WITH FUEL CUT REQUESTED
510 MONITOR GPF SOOT (PARTICULATE) LOAD
515 IS GPF LOAD>UPPER VALUE
520 USE GPF INLET VALVE CLOSED WITH FUEL CUT
525 OVER-RUN END
530 AWAIT NEXT REQUEST
535 USE GPF INLET VALVE OPEN WITH FUEL CUT
540 IS GPF LOAD<LOWER VALUE
545 MONITOR GPF SOOT (PARTICULATE) LOAD
550 RE-INSTATE FUELING (OPTIONAL)

The invention claimed is:

1. An exhaust system for exhausting combustion gases from an internal combustion engine, the exhaust system comprising:
   an exhaust conduit for conveying exhaust gases from the internal combustion engine;
   a particulate filter for filtering particulates from the exhaust gases conveyed by the exhaust conduit;
   a supply inlet arranged to introduce gas into the particulate filter to promote regeneration, the supply inlet being disposed upstream of the particulate filter and downstream of a catalytic convertor;
   a control valve for controlling the supply of gas to the particulate filter to control regeneration; and
   a controller configured to control the control valve to control regeneration of the particulate filter, the controller being configured to:
      determine a particulate loading of the particulate filter; and
      output a control signal to control the control valve to control regeneration of the particulate filter in dependence on the determined particulate loading;
   wherein the controller is configured to compare the determined particulate loading to a predetermined first loading threshold;
   wherein the control signal comprises an open valve request to open the control valve and a fuel cut request to inhibit the supply of fuel to the engine, both in dependence on a determination that the particulate loading is greater than the first loading threshold;
   wherein the controller is configured to compare the determined particulate loading to a predetermined second loading threshold, the second loading threshold being greater than zero and less than the first loading threshold;
   wherein the control signal comprises a close valve request to close the control valve in dependence on a determination that the particulate loading is less than the second loading threshold; and
   wherein the controller is configured to compare the determined particulate loading to a predetermined third loading threshold, and when the determined particulate loading decreases to the third loading threshold or below, to reinstate the supply of fuel to the engine.

2. The exhaust system as claimed in claim 1, wherein the supply inlet comprises a gas supply inlet for introducing gas at a higher pressure than that of the exhaust gases in the exhaust system.

3. The exhaust system as claimed in claim 2, wherein the gas supply inlet is connected to a pressurised gas supply.

4. The exhaust system as claimed in claim 2, wherein the exhaust conduit is configured to reduce the pressure of the exhaust gases in the region of the gas supply inlet.

5. The exhaust system as claimed in claim 4, wherein the exhaust system comprises a constricted section for reducing the gas pressure in the exhaust conduit in the region of the supply inlet.

6. The exhaust system as claimed in claim 1, wherein the supply inlet is configured to introduce air into the exhaust conduit.

7. The exhaust system as claimed in claim 1, wherein the particulate filter comprises or consists of a gasoline particulate filter.

8. A vehicle comprising the internal combustion engine and the exhaust system as claimed in claim 1.

9. The vehicle as claimed in claim 8, wherein the supply inlet is connected to a manifold boost system of the internal combustion engine; or a secondary air injection system.

10. A vehicle comprising the controller as claimed in claim 1.

11. A method of controlling regeneration of a particulate filter disposed in an exhaust system for exhausting combustion gases from an internal combustion engine, the method comprising:
    determining a particulate loading of the particulate filter; and
    controlling the opening and closing of a control valve in dependence on the determined particulate loading to control the supply of air to the particulate filter to control regeneration;
    wherein the method includes comparing the determined particulate loading to a predetermined first loading threshold;
    wherein the method includes opening the control valve and inhibiting the supply of fuel to the engine, both in dependence on a determination that the particulate loading is greater than the first loading threshold;
    wherein the method includes comparing the determined particulate loading to a predetermined second loading threshold, the second loading threshold being greater than zero and less than the first loading threshold;
    wherein the method includes outputting a close valve request to close the control valve in dependence on a determination that the particulate loading is less than the second loading threshold; and
    wherein the method comprises comparing the determined particulate loading to a predetermined third loading threshold and, when the determined particulate loading decreases to the third loading threshold or below, reinstating the supply of fuel to the engine.

12. The method as claimed in claim 11, wherein the method comprises:
    determining a temperature of the particulate filter; and
    controlling the opening of the control valve in dependence on the determined temperature.

13. A non-transitory computer readable medium comprising computer readable instructions that, when executed by a processor, cause performance of the method as claimed in claim 11.

* * * * *